United States Patent
Uesugi

[11] 3,997,245
[45] Dec. 14, 1976

[54] CLOSE-UP FOCUSING DEVICE IN A PHOTOGRAPHIC LENS ASSEMBLY

[75] Inventor: Kyozo Uesugi, Izumi, Japan

[73] Assignee: Minolta Camera Kabushiki Kaisha, Osaka, Japan

[22] Filed: Mar. 25, 1975

[21] Appl. No.: 562,036

Related U.S. Application Data

[63] Continuation of Ser. No. 395,452, Sept. 10, 1973, abandoned.

[30] Foreign Application Priority Data

Sept. 22, 1972 Japan .............................. 47-95712

[52] U.S. Cl. ................................. 350/187; 350/255
[51] Int. Cl.² .................................. G02B 7/10
[58] Field of Search ............... 350/186, 187, 255

[56] References Cited
UNITED STATES PATENTS

| | | | |
|---|---|---|---|
| 2,732,763 | 1/1956 | Back et al. | 350/186 |
| 2,940,373 | 6/1960 | Berg et al. | 350/187 X |
| 2,984,167 | 5/1961 | Staubach | 350/255 X |
| 3,233,514 | 2/1966 | Eberhardt | 350/187 |

*Primary Examiner*—Paul A. Sacher
*Attorney, Agent, or Firm*—Wenderoth, Lind & Ponack

[57] ABSTRACT

In a photographic lens assembly having a plurality of lenses and held in a frame, an improved close-up focusing device in which an actuating shaft is rotatably provided in the frame and a transmission means connects the shaft and a mount holding one lens of the assembly in such a manner that the mount is moved relative to the frame in a direction parallel to the optical axis of the assembly by the rotation of the shaft, whereby close-up focusing is effected at, and independent of, any setting of the zoom lens assembly.

13 Claims, 7 Drawing Figures

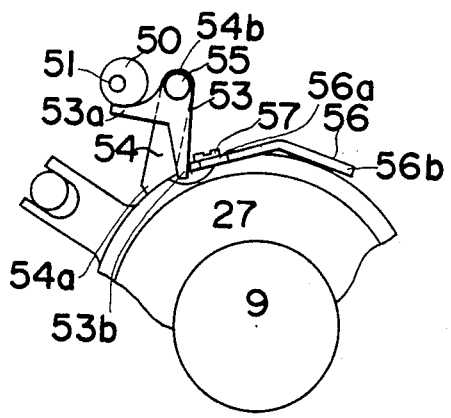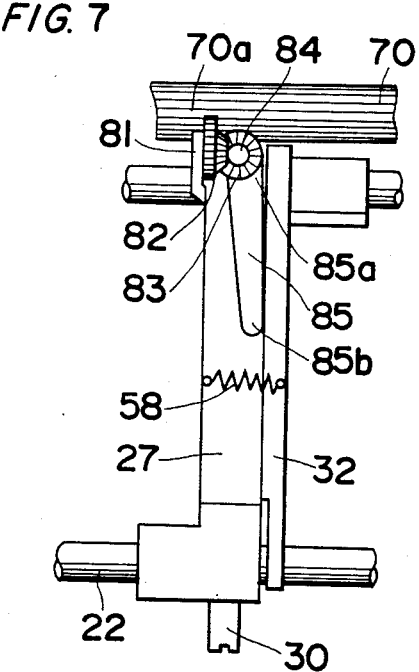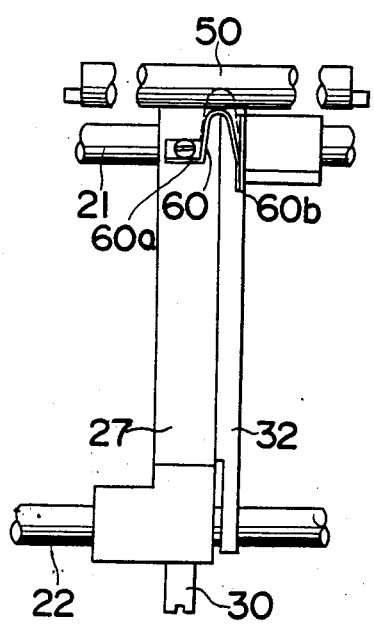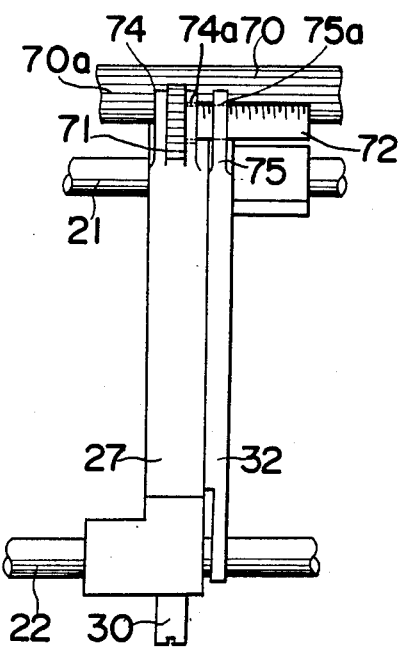

3,997,245

CLOSE-UP FOCUSING DEVICE IN A PHOTOGRAPHIC LENS ASSEMBLY

This is a continuation of application Ser. No. 395,452, filed Sept. 10, 1973, now abandoned.

BACKGROUND OF THE INVENTION

The present invention relates to a close-up focusing device for a photographic lens assembly, and, more particularly to a device for sliding certain lens components forward and backward along their optical axes to make the lens suitable for close-up focusing, so as to be adaptable particularly to office document copying use or photographing use and the like.

It has been known conventionally to provide a type of lens assembly known as a zoom lens, whose focal length can be varied continuously, and which permits a photographer to take close-up or long shots of a particular scene without having to actually move towards or away from the scene. Such zoom lens assemblies conventionally comprise a focusing lens, which is positioned foremost in the camera, a variator positioned behind the focusing lens, a compensator lens positioned behind the 1st magnifying lens, and a master lens which is positioned rearmost in the camera. Each of these various lenses generally comprises a group of lenses. Recently, in order to get close-up or macrophotographing in the zoom lens system above-referred to it has been proposed to employ a method of moving, in any one of the lens groups, certain of the lenses in such group relative to others in such group. However, this known close-up mechanism is designed such that it makes it possible to do the adjustment or manipulation for close-up photography only after setting every lens component of the lens assembly at predetermined positions and if the focal length for close-up is specified. Also, the conventional close-up mechanism for the zoom lens assembly is coupled to the zoom mechanism in a complex manner, so that it has a complex construction which makes it difficult to design as a power driving type system.

SUMMARY OF THE INVENTION

It is a object of the present invention to provide a close-up focusing device in a photographic lens assembly, especially, in a photographic zoom lens assembly which offers the advantages that subsidiary close-up focusing may be effected at any setting of a zoom-lens assembly, and that close-up focusing and setting of the zoom lens assembly may be effected in complete independence of one another.

It is therefore, another object of the present invention to provide a lens moving device suitable for close-up focusing, even during a zooming operation. In the present invention, because the lens sliding device for close-up focusing is movable independently of the lens sliding for zooming purpose, close-up focusing is possible at an optional focal distance set by zooming, thus providing a device suitable for power driving close-up focusing.

It is a further object of the present invention to provide a close-up focusing device in a photographic zoom lens assembly which may be conveniently made in various sizes, which is simple, compact and light-weight in design, which is durable in construction, which is reasonable in manufacturing cost, and which is capable of performing its intended function in an entirely, automatically, satisfactory and trouble-free manner.

An essential feature of the present invention resides in that, in a camera having a fixed main frame, and a plurality of lenses or lens assemblies held in mounts which are movable relative to the main frame in a direction that is parallel to the optical axis of the lenses or lens assemblies, an auxiliary focusing device comprising a rotatable shaft, which is supported by the main frame, and is aligned parallel to the optical axis of the lenses or lens assemblies, and a transmission means, which connects to the rotatable shaft and to a mount holding one or more of the lenses or lens assemblies is provided, whereby the mount holding one more of the lenses or lens assemblies may be moved relative to the main frame and in a direction that is parallel to the optical axis of said lenses or lens assemblies by rotation of the rotatable shaft.

BRIEF DESCRIPTION OF THE DRAWINGS

These and other objects and features of the present invention will become apparent from the following description take in conjunction with preferred embodiments thereof with reference to the accompanying drawings, in which;

FIG. 4 is a front view showing a part of the device of FIG. 3, and FIGS. 5 to 7 are respectively side elevational views similar to FIG. 3 of other embodiments of the present invention.

DETAILED DESCRIPTION OF THE INVENTION

Before proceeding with the description it is to be noted that, throughout the several attached drawings, like numbers refer to like parts. It is also to be noted that for the purposes of the description, terms having reference to location or direction, such as upper, lower, forwards, or rearwards, are to be taken as meaning nearer the top or bottom of a normally upright camera, and towards or away from the front of a camera.

Figure 1:
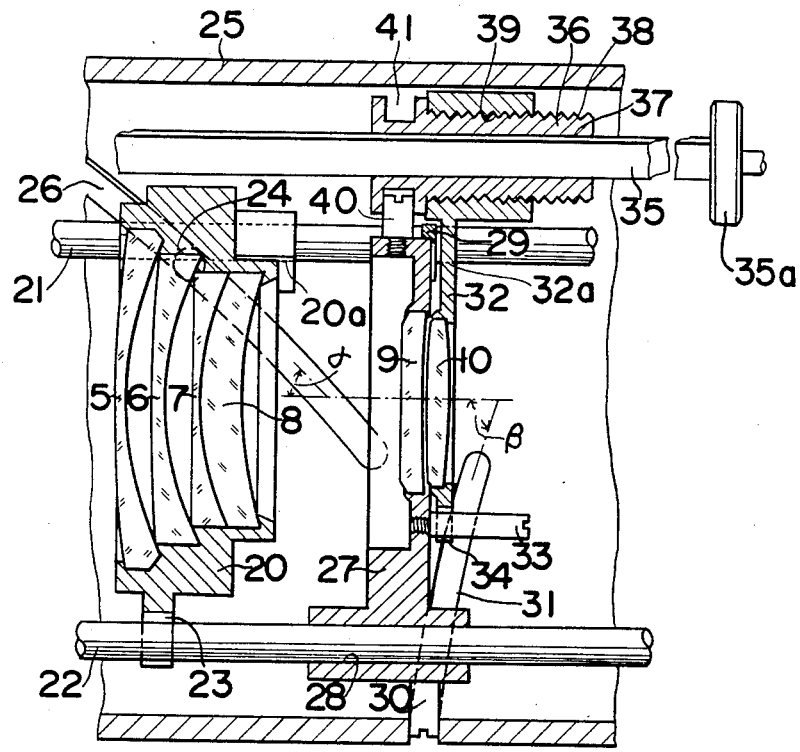
FIG. 1 is a cross-sectional view showing an essential portion of a close-up device in accordance with one preferred embodiment of the present invention.

Referring now to FIG. 1, there is shown a portion of a zoom lens assembly, which comprises a 1st magnifying lens assembly composed of lenses 5–8, and a 2nd magnifying lens assembly composed of lenses 9–10. The other portions of the zoom lens assembly are eliminated from FIG. 1, for the sake of brevity, and may include, for example, a focusing lens, which is positioned foremost in the camera before the 1st magnifying lens assembly, and a master lens, which is positioned rearmost in the camera behind the 2nd magnifying lens assembly. The 1st magnifying lens assembly is fixedly mounted in a generally circular 1st lens mount 20, which holds the lenses 5–8. The 2nd magnifying lens assembly is fixedly mounted in two generally circular lens mounts, which are a 2nd lens mount 27 holding the lens 9, and a 3rd lens mount 32 holding the lens 10. When the 1st lens mount 20 is moved forwards or rearwards, in a manner described below, the 1st magnifying lens assembly is moved forward together therewith, the lenses 5–8 moving together as a body. The positions of the lenses 5–8 relative to one another within the 1st lens assembly are at all times unchanged. The 2nd lens assembly is similarly moved forwards or rearwards by forwards or rearwards movement of the 2nd lens mount 27, and during such movement the lense 9–10 may be moved as a body. The zooming operation for altering the magnification of the object to be photographed is established by the movements of both the 1st lens mount and the 2nd lens mount to change the distance between the 1st and 2nd magnifying lens assemblies 5–8 and 9–10. In contrast to this, the position of the lenses 9, 10 relative to one another may be changed, as described below. In other words, the close-up operation for making macrophotographs and copies is obtained by changing the distance between lenses 9 and 10.

An opening 20a parallel to the optical axis of the lens assemblies is formed in, and passes through the upper side of the 1st lens mount 20. At the lower side of the 1st lens mount 20 there is formed a forked extension 23. A pin 24, which engages a 1st cam groove 26 of a frame or draw tube 25 as described below, is fixedly attached to, and projects from the 1st lens mount 20. An opening 28 parallel to the optical axis of the lens assemblies is formed in, and passes through the lower side of the 2nd lens mount 27. At the upper side of the 2nd lens mount 27 there is formed a forked extension 29. A pin 30, which engages a 2nd cam groove 31 of the draw tube 25 as described below is fixedly attached to, and projects from the 2nd lens mount 27. A stud 40 is fixedly attached to, and projects from the upper side of the 2nd lens mount 27. A short, rearwardly extending slide shaft 33 is fixedly attached to the rear side of the 2nd lens mount 27, at a point thereon that is below the lens 9. The short slide shaft 33 lies parallel to the optical axis of the lens assemblies and acts as a guide for movement of the 3rd lens mount 32. The 3rd lens mount 32 is shorter in top to bottom dimension than the 1st and 2nd lens mounts 20 and 27, and the bottom side thereof forms a forked extension 34 which fits slidably around the short slide shaft 33. An opening 32a parallel to the optical axis of the lens assemblies is formed in, and passes through the upper side of the 3rd lens mount 32. The 3rd lens mount 32 also forms an upwards extension which is fixedly attached to, or formed integrally with an internally threaded sleeve 39 as described below.

The 1st and 2nd magnifying lens assemblies are contained within the draw tube 25, which is mounted to the body of a camera, or a fixed part thereof. The draw tube 25 is rotatable by a conventional means in a known manner and the longitudinal axis thereof is parallel to the optical axis of the lens assemblies. The above-mentioned 1st and 2nd cam grooves 26, 31 are formed in the inner surface of the draw tube 25, and are inclined at angles $\alpha$, $\beta$, respectively to the longitudinal axis thereof. The angle $\alpha$ is smaller than angle $\beta$, and the 1st cam groove 26 is longer than the 2nd cam groove 31. The forward end of the 1st cam groove 26 is higher than the rear end thereof. The forward end of the 2nd cam groove 31 is lower than the rear end thereof. In other words, seen in cross-section, as in FIG. 1, the 1st cam groove 26 slopes downwards from an upper portion of the draw tube 25 interior, and the 2nd cam groove 31 slopes upwards from a lower portion of the draw tube 27 interior.

Within the draw tube 25, and on opposite sides thereof, there are provided upper and lower guide bars 21, 22, which are aligned parallel to the optical axis of the 1st and 2nd magnifying lens assemblies. The guide bars 21, 22 are fixedly attached to a camera body tube, and ensure that forwards or rearwards movement of the 1st and 2nd lens assemblies is effected along a line parallel to the optical axis thereof. The upper guide bar 21 passes through the 1st lens mount opening 20a, the 2nd lens mount forked extension 29, and the 3rd lens mount opening 32a, and permits forwards or rearwards sliding motion of the 1st, 2nd and 3rd lens mounts 20, 27 and 32. The lower guide bar 22 passes through the 1st lens mount forked extension 23 and the 2nd lens mount extension 28, and permits forwards or rearwards motion of the 1st and 2nd lens mounts 20, 27. Since the 1st and 2nd lens mounts 20, 27 are slidably mounted on two opposed guide bars 21, 22, and the 3rd lens mount 32 is slidably mounted on the upper guide bar 21 and also on a slide shaft 33 projecting rearwards from the 2nd lens mount 27, the 1st, 2nd, and 3rd lens mounts 20, 27, 32, and the lenses 5–8, 9 and 10 held therein may be moved forwards or rearwards in a straight line, but may not be rotated.

As described earlier, the 1st cam groove 26 is engaged by the pin 24 projecting from the 1st lens mount 20, and the 2nd cam groove 31 is engaged by the pin 30 projecting from the 2nd lens mount 27. When, therefore, the draw tube 25 is rotated by a conventional suitable means, the pins 24, 30 are constrained to follow the 1st and 2nd cam grooves 26, 31, and the 1st and 2nd lens mounts 20, 27 are moved forwards or rearwards, the displacement of the 1st lens mount 20 differing from that of the 2nd lens mount 27, because of the difference between the angles $\alpha$, $\beta$, at which the 1st and 2nd cam grooves 26, 31 are inclined to the longitudinal axis of the draw tube 25. The 2nd lens mount 27 acts on the 3rd lens mount 32 through the above-mentioned stud 40 and sleeve 39, in a manner described below, and when the draw tube 25 is rotated, the 3rd lens mount 32 is displaced by the same amount as the 2nd lens mount 27. In other words, zoom lens focusing of the 1st and 2nd magnifying lens assemblies can be effected by rotation of the draw tube 25.

A square shaft 35 of a square, or rectangular cross-section, having a knob 35a, is provided in an upper portion of the interior of the draw tube 25. The square shaft 35 is supported at one end by the fixed body tube of the camera, and is aligned parallel to the longitudinal axis of the draw tube 25, and therefore also parallel to the optical axis of the 1st and 2nd magnifying lens assemblies. The square shaft 35 may be journaled, but may not be moved forwards or rearwards. The square shaft 35 is provided with a knob, or similar means, whereby the shaft 35 may be rotated. The square shaft 35 passes through a slider 36. An opening 37 which is square, or rectangular, in cross-section, and has dimensions that are close to, but slightly greater than the outer dimensions of the square shaft 35, is formed in the slider 36. The opening 37 permits the slider 36 to slide along the square shaft 35, but does not permit the slider 36 to move relative to the square shaft 35 in any other direction, for example, upwards or downwards. Therefore, when the square shaft 35 is rotated, the sides thereof press against the sides of the slider opening 37, and cause the slider 36 also to be rotated. An annular groove 41 is formed in the outer periphery of the slider 36, near the forward end thereof. The groove 41 forms a complete circle passing around the slider 36, and is engaged by the above-mentioned stud 40, which is fixedly attached to, and projects from the 2nd lens mount 27. The dimensions of the stud 40 and groove 41 are such that there may be relative sliding motion without play therebetween. In other words, the stud 40 does not impede rotation of the slider 36, but when the 2nd lens mount 27 is moved forwards or rearwards, the stud 40 presses against the sides of the groove 41 and causes the slider 36 also to be moved an equivalent distance forwards or rearwards.

The outer surface of the main body of the slider 36, lying to the rear of the groove 41, forms an external thread 38. The above-mentioned threaded sleeve 39, which is fixedly attached to, or integrally formed with an upper portion of the 3rd lens mount 32, fits around the slider 36, and the internal thread of the sleeve 39 engages the external thread 38 of the slider 36. If, therefore, the slider 36 is moved forwards or rearwards the threaded sleeve 39 is compelled to move forwards or rearwards an equivalent distance. In other words, the 3rd lens mount 32 being compelled to move with the sleeve 39, acting through the thread 38, and the slider 36 being moved forwards or rearwards by forward or rearward movement of the 2nd lens mount 27, acting through the stud 40, when the draw tube 25 is rotated, the lenses 9, 10 held in the 2nd and 3rd lens mounts 27, 32 are both moved forwards or rearwards an equal amount.

However, subsidiary close-up focusing of the lenses 9, 10 may be effected independently of rotation of the draw tube 25, by rotating the square shaft 35. If the square shaft 35 is rotated by the rotation of the knob 35a while the 2nd lens mount 27 is held still, that is, while the draw tube 25 is not rotated, since the shaft 35 may not move forwards or rearwards, the sleeve 39 is compelled to move forwards or rearwards along the slider 36, due to the engagement of the internal thread of the sleeve 39 and the slider external thread 38, and the 3rd lens mount 32 slides on the upper guide shaft 21 and the short slide shaft 33, and is moved forwards or rearwards independently of the 2nd lens mount 27. Thus rotation of the square shaft 35 makes it possible to adjust the positions of the lenses 9, 10 relative to one another, i.e. slider 36 and sleeve 39 form a transmission means or device to transduce rotary movement of shaft 35 into longitudinal movement of mount 32 with respect to mount 27.

By means of the present invention, zoom lens operation and subsidiary close-up focusing may be effected completely independently of one another, and subsidiary focusing may be effected at any setting of a zoom lens assembly. It is to be noted, however, that because of the characteristics of the lenses normally employed, lack of focus will result if the lenses 9, 10 are separated from one another when taking shots at normal distances. Therefore, after rotating the square shaft 35 in order to adjust the position of the lens 10, for some particular purpose, the shaft 35 should be turned back again as far as possible to bring the lens 10 adjacent to the lens 9, when it is required to use the camera for standard photography.

Figure 2:
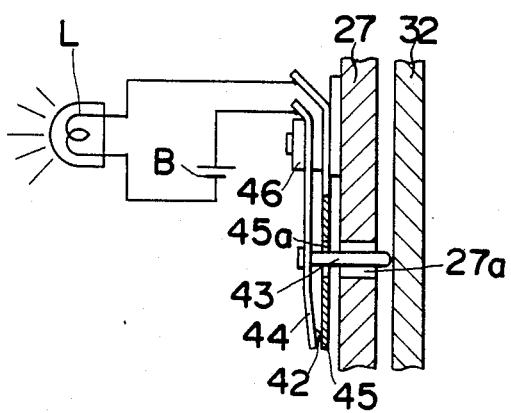
FIG. 2 is a cross-sectional view, on an enlarged scale, showing a modified part of the device of FIG. 1.

To enable a photographer to known when the square shaft 35 has been turned back sufficiently to bring the lens 10 adjacent to the lens 9, a lens position detection means, shown in FIG. 2, is optionally provided in association with the above described embodiment of the present invention, or with other embodiments thereof. Referring to FIG. 2, the lens position detection means may be seen to comprise a lamp L, and 1st and 2nd contact strips 44, 45. The 1st contact strip 44 is a flexible spring plate, and both strips 44, 45 are made of electrically conductive material. The 1st and 2nd contact strips 44, 45 are mounted separately in a block 46, which is made of a dielectric material, and is fixedly attached to the forward side of the 2nd lens mount 27, that is, the side thereof opposite the 3rd lens mount 32, and both strips 44, 45 lie approximately parallel to the forward side of the 2nd lens mount 27, the 2nd contact strip 45 being closer thereto than the 1st contact strip 44. A contact stud 42 is fixedly attached to the lower end of the 1st contact strip 44. The spring force of the 1st contact strip 44 inclines the 1st contact strip 44 towards the 2nd contact strip 45, and when unopposed, causes the 1st contact strip 44 to take up an alignment in which the contact stud 42 is pressed against the lower end of the 2nd contact strip 45, thus establishing contact between the 1st and 2nd strips 44, 45. One terminal of the lamp L is connected to the upper end of the 2nd contact strip 45, and the other terminal thereof connects through a power source B to the upper end of the 1st contact strip 44. When, therefore, the stud 42 contacts the 2nd contact strip 45, as described above, the power supply circuit to the lamp L is closed, and the lamp L lights up.

A pin 43 is fixedly attached to the 1st contact strip 44, and extends rearwards therefrom. The pin 43 passes freely through an opening 45a formed in the 2nd contact strip 45 and an opening 27a formed in the 2nd lens mount 27. The pin 43 extends to beyond the rear side of the 2nd lens mount 27, and the rear end thereof may be contacted by the forward side of the 3rd lens mount 32. When the 3rd lens mount 32 is in a foremost position, and the lens 10 is adjacent to the lens 9, as required for shooting standard scenes, the forward side of the 3rd lens mount 32 presses against the rear end of the pin 43, and pushes the 1st contact strip 44 forward, into an alignment in which the stud 43 no longer contacts the 2nd contact strip 45. In this configuration, therefore, the power supply circuit to the lamp L is open, and the lamp L cannot light up. When however, for the purpose of close-up focusing, the 3rd lens mount 32 and lens 10 are moved away from the 2nd lens mount 27 and lens 9, the 3rd lens mount 32 ceases to exert pressure on the pin 43, and the spring force of the 1st contact strip 44 causes the stud 43 to be moved into contact with the 2nd contact strip 45, whereupon the lamp L lights up. When, therefore, a photographer wishes to readjust the position of the lens 10 for shooting a normal scene it is simply necessary to turn the square shaft 35 until the lamp L goes out, to give an immediate indication that the lens 10 has been moved back adjacent to the lens 9. If it is required to extinguish the lamp L during close-up focusing, the 1st contact strip 44 may be composed of two portions (not shown) and there may be provided a switch, which makes or breaks contact between the two portions. The switch is actuated to make contact between the two portions only when it is required to move the lens 10 back to the lens 9. At all other times, the switch keeps contact between the portions open, so that the lamp L does not light up, regardless of contact of the stud 43 with the 2nd contact strip 45.

The description will proceed hereinbelow with reference to means for moving the lens 10 relative to the lens 9 according to the other embodiments, which are shown in FIGS. 3 to 7.

Other elements in the 2nd, 3rd and 4th embodiments are the same as employed in the 1st embodiments, and description thereof will therefore be omitted.

Figure 3:
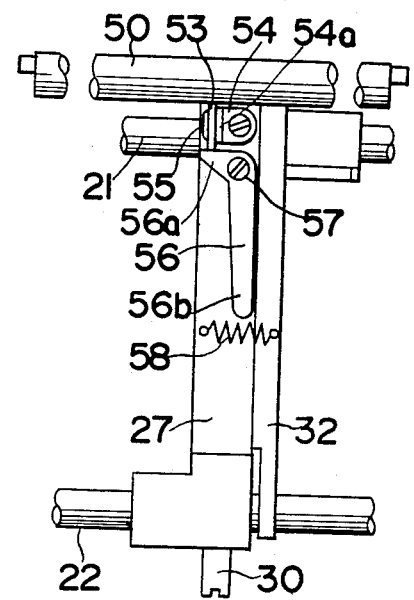
FIG. 3 is a side elevational view showing a portion of a close-up device in accordance with another embodiment of the present invention.

According to the 2nd embodiment, shown in FIGS. 3 and 4, an L-shaped support 54 is fixedly attached to the outer periphery of the 2nd lens mount 27, near the top thereof. One leg 54a of the L-shaped support 54 lies on, and is fixedly attached to the 2nd lens mount 27, and the other support leg 54b projects outwardly therefrom. A two arm rocker 53 is pivotally mounted to the outer end of the support leg 54b by means of a pin 55. The rocker 53 lies on a plane that is generally perpendicular to the longitudinal axis of the draw tube 25, that is the plane of the flat surface of the rocker 53 is generally parallel to the forward side of the 2nd lens mount 27, as shown in FIG. 4. One arm 53a of the rocker 53 is contacted by an eccentric rotartory shaft 50, and the other rocker arm 53b contacts a lever 56 as described below. The shaft 50 is mounted at one end to the fixed body tube of the camera, and is parallel to the longitudinal axis of the draw tube 25. The shaft 50 having a circular section is rotated by a knob or similar means connected thereto and provided externally to the camera, and when rotated turns about off-centre pins 51 provided at opposite ends thereof. If the eccentric rotatory shaft 50 is rotated so that the portion thereof lying opposite the rotatory axis passing through the pins 51 is brought into contact with the rocker arm 53a, the rocker 53 pivots on the pin 55, and is turned counter-clockwise, as seen from the front of the camera.

The above-mentioned lever 56 is approximately L-shaped and is pivotally mounted on a pin 57, which is fixedly attached to the outer periphery of the 2nd lens mount 27. One arm 56a of the lever 56 is contacted by the rocker arm 53b, and the outer lever arm 56b is generally aligned with, and contacts the front side of the 3rd lens mount 32. The 2nd and 3rd lens mounts 27, 32 are normally held adjacent to one another by a compression spring 58, opposite ends of which are fixedly attached to the 2nd and 3rd lens mounts 27, 32, respectively. When, however, the eccentric shaft 50 is rotated and the rocker 53 is caused to turn counter-clockwise, the rocker arm 53b presses against the lever arm 56a, and causes the lever 56 to pivot about the pin 57. When the lever 56 is thus turned, the outer end of the lever arm 56b presses against the front side of the 3rd lens mount 32, and, overcoming the force of the spring 58, causes the 3rd lens mount 32, and lens 10 held therein, the move rearwards. In order to effect close-up focusing, a photographer may therefore turn the shaft 50, and cause the lens 10 to be moved to different positions relative to the lens 9. When the shaft 50 is turned so that the portion thereof closer to the rotational axis passing through the pins 51 is brought into contact with the rocker 53, no pressure is exerted on the rocker arm 53a. The rocker arm 53b therefore does not press the lever arm 56b, the lever 56 exerts no pressure on the 3rd lens mount 32, and the spring 58 is unopposed, and brings the 3rd lens mount 32 adjacent to the 2nd lens mount 27.

FIG. 5 shows a 3rd embodiment of the present invention, in which the 2nd and 3rd lens mounts 27, 32 are normally held together by a curved plate spring 60. One end 60a of the plate spring 60 is fixedly attached to the outer periphery of the 2nd lens mount 27. The other end 60b of the plate spring 60 is fixedly attached to the 3rd lens mount 32, or to a slider which slides on the upper guide bar 21 and is fixedly attached to the 3rd lens mount 32. The curved plate spring 60 forms an inverted V-shape with respect to the 2nd and 3rd lens mounts 27, 32, and an edge thereof is contacted by an eccentric rotatory shaft 50, as used in the 2nd embodiment. The spring 60 has a resilient force which normally biases both ends thereof to force the 3rd lens mount 32 to contact with the 2nd lens mounts 27. When the eccentric shaft 50 is rotated so that the shaft portion further removed from the rotational axis comes into contact with the plate spring 60, the shaft 50 exerts pressure on the spring 60, to cause the spring 60 to spread, i.e. to move end 60b away from end 60a (to the right, as seen in FIG. 5). Since the spring ends 60a, 60b are attached to the 2nd and 3rd lens mounts 27, 32, respectively, this spreading movement causes the spring 60 to open, that is, there is a force acting to move the ends 60a, 60b away from one another. The pin 30 projecting from the 2nd lens mount 27 is engaged in the cam groove 31 of the draw tube 25, and the 2nd lens mount 27 may be moved only when the draw tube 25 is rotated, but the 3rd lens mount 27 may slide independently of the 2nd lens mount 27, along the guide bar 21 and short shaft 33. Therefore when the plate spring 60 spreads, the 3rd lens mount 32 is pushed away from the 2nd lens mount 27. The amount of displacement of the 3rd lens mount 32 relative to the 2nd lens mount 27 is, of course, proportional to the pressure exerted by the spring end 60b, the pressure exerted by the spring end 60a is proportional to the pressure exerted by the eccentric shaft 50 on the spring 60, and the pressure exerted by the eccentric shaft 50 is proportional to the degree of angular rotation of the shaft 50. The position of the lens 10 relative to the lens 9 may therefore be accurately adjusted, for the purpose of close-up focusing, by rotation of the eccentric shaft 50. When the eccentric shaft 50 is rotated so that the shaft side nearer the rotatory axis thereof is brought into contact with the edge of the plate spring 60, no pressure is exerted on the spring 60, and the spring 60 returns to ts original position, and pulls the 3rd lens mount 32 into contact with the 2nd lens mount 27. That is, the lenses 9, 10 are positioned as required for shooting scenes at standard distances.

In a 4th embodiment of the present invention, shown in FIG. 6, the eccentric shaft is replaced by a rotary shaft 70, the outside periphery of which forms a gear wheel 70a. The 2nd and 3rd lens mounts 27, 32 are provided with a double lug 74 and a single lug 75, respectively, the lugs 74, 75 being aligned with one another. An internally threaded opening 75a is formed in the lug 75. A screw 72 is screwed into the opening 75a and engages the thread thereof. The screw 72 is coaxial with, and fixedly attached to, or integrally formed with, a gear wheel 71. The gear wheel 71 is mounted in the double lug 74 and is freely rotatable therein. The screw 72 passes through an opening 74a which is formed in one side of the double lug 74, and which has a diameter greater than the external diameter of the screw 72. The gear wheel 71 is engaged by the gear wheel 70a of shaft 70. When, therefore, the shaft 70 is rotated, the gear wheel 71 and screw 72 are rotated, and engagement of the screw 72 with the thread of the opening 75a causes the lug 75, and the 3rd lens mount 32 to be moved rearwards, thus permitting adjustment of the focus provided by the lenses 9, 10. Rotation of the shaft 70 in the opposite direction causes the 3rd lens mount 32 to be moved back to the 2nd lens mount 27.

In another embodiment of the present invention, shown in FIG. 7, the 2nd and 3rd lens mounts 27, 32 are normally held in contact by a spring 58, as in the 2nd embodiment. A freely rotatable miter gear 82 is mounted on a lug 81 projecting from the 2nd lens mount 27. A gear shaft 70, is formed and mounted as in the 4th embodiment. The miter gear 82 engages and rotates a bevel gear 83, In other words, rotation of the shaft 70 causes rotation of the bevel gear 83 by means of miter gear 82. The bevel gear 83 is rotatably mounted on a pin 84, which is fixedly attached to the outer periphery of the 2nd lens mount 27. One end 85a of a lever 85 is fixedly attached to the bevel gear 83, and also rotatably mounted on the pin 84. The other end 85b of the lever 85 contacts the forward side of the 3rd lens mount 32.

When the bevel gear 83 is rotated in one direction, the lever 85 is turned in the same direction, and the lever end 85b pushes the 3rd lens mount 32 rearwards, in opposition to the force of the spring 58. In other words, the position of the 3rd lens mount 32 and lens 10 relative to the 2nd lens mount 27 and lens 9 may be adjusted as required by suitable rotation of the shaft 70.

As is clear from the above description, the present invention provides a means which is simple in construction, and offers the advantages that subsidiary close-up focusing may be effected at any setting of a zoom-lens assembly, and that close-up focusing and setting of a zoom lens assembly may be effected in complete independence of one another.

It is to be noted that the component of the lens assembly to be moved depends upon the formation of the lens assembly, and the device of the present invention makes it possible to move any component in accordance with the formation of the lens assembly. Furthermore, the device of the present invention is applicable to not only a zoom lens assembly but also a lens assembly of the fixed focal type, wherein it is possible to conduct close-up photography without using a special attachment, such as a close-up lens or bellows, which is indispensable in the conventional devices.

Although the present invention has been fully described, by way of examples, it is to be noted that various changes and modifications are apparent to those skilled in the art. Therefore, unless they otherwise depart from the true scope of the present invention, they should be construed as included within the scope of the present invention.

What is claimed is:

1. In a photographic lens assembly including a rotatable frame and a plurality of lenses; at least two lens mounts; one of said lenses being supported on one of said lens mounts and another of said lenses being supported on another of said lens mounts; said lens mounts being supported in said frame for movement as a unit in a direction corresponding to the optical axis of said lenses in response to rotation of said frame; the improvement including an improved close-up focusing device comprising:
   a shaft mounted in said assembly for rotation independent of the rotation of said frame, said shaft extending in a direction parallel with said optical axis of said lenses, said shaft being longitudinally immovable; and
   transmission means operatively coupled to said shaft and said mounts for transducing rotary movement of said shaft into longitudinal movement of one only of said mounts relative to the remainder of said mounts in a direction corresponding to said optical axis of said lenses, and for isolating said shaft from said mounts upon the movement as a unit of said mounts caused by rotation of said frame.

2. The improvement claimed in claim 1, further comprising means coupled to at least one of said mounts for indicating the position of said one mount relative to said remainder of said mounts.

3. The improvement claimed in claim 1, wherein said transmission means comprises a slider mounted on said shaft and having a configuration to slide therealong and to rotate therewith, said slider having external threads mating with internal threads of said one mount, said one mount thus being movable without rotation in said direction upon rotation of said shaft, and said slider being slidable longitudinally along said shaft upon the movement as a unit of said mounts caused by rotation of said frame.

4. The improvement claimed in claim 1, wherein said transmission means comprises an eccentric surface of said shaft, and an intermediate lever means mounted on one of said remainder of said mounts to be contacted by said eccentric surface for swinging movement against said one mount and for moving said one mount in said direction upon rotation of said shaft, said lever means being slidable longitudinally with respect to said shaft upon the movement as a unit of said mounts caused by rotation of said frame.

5. The improvement claimed in claim 1, wherein said transmission means comprises an eccentric surface of said shaft, and a curved plate spring attached to said one mount and to one of said remainder of said mounts, said eccentric surface comprising means for spreading said spring upon rotation of said shaft for moving said one mount in said direction, said spring being slidable longitudinally with respect to said spreading means upon the movement as a result of said mounts caused by rotation of said frame.

6. The improvement claimed in claim 1, wherein said transmission means comprises gear teeth formed on the periphery of said shaft; a gear wheel rotatably mounted on one of said remainder of said mounts and meshing with said gear teeth; and a screw integral with said gear wheel and meshing in a threaded opening in said one mount, said gear wheel being slidable longitudially with respect to said gear teeth upon the movement as a unit of said mounts caused by rotation of said frame.

7. The improvement claimed in claim 1, wherein said transmission means comprises gear teeth formed on the periphery of said shaft; a gear means mounted on one of said remainder of said mounts and meshing with said gear teeth; and a lever integral with said gear means and having an end abuttable with said one mount for moving said one mount in said direction upon rotation of said shaft, said gear means being slidable longitudinally with respect to said gear teeth upon the movement as a unit of said mounts caused by rotation of said frame.

8. In a photographic lens assembly including a rotatable frame, a first and a second mount, and a zoom lens assembly having a plurality of lens units, one of said lens units being supported by said first and second mounts and having a lens integral with said first mount and another lens integral with said second mount; said first and second mounts being supported in said frame for movement as a unit in the direction of the optical axis of said lens units in response to rotation of said frame; the improvement including an improved close-up focusing device comprising:

a shaft mounted in said assembly for rotation independent of the rotation of said frame, said shaft extending in a direction parallel with said optical axis of said lens units, said shaft being longitudinally immovable; and transmission means operatively coupled to said shaft and said first and second mounts for transducing rotary movement of said shaft into longitudinal movement of said first mount relative to said second mount in a direction corresponding to said optical axis of said lens units, and for isolating said shaft from said first and second mounts upon the movement as a unit of said first and second mounts caused by rotation of said frame.

9. The improvement claimed in claim 8, wherein said transmission means comprises a slider mounted on said shaft and having a configuration to slide therealong and to rotate therewith, said slider having external threads mating with internal threads of said first mount, said first mount thus being movable without rotation in said direction upon rotation of said shaft, and said slider being slidable longitudinally along said shaft upon the movement as a unit of said first and second mounts caused by rotation of said frame.

10. The improvement claimed in claim 8, wherein said transmission means comprises an eccentric surface of said shaft, and an intermediate lever means mounted on said second mount to be contacted by said eccentric surface for swinging movement against said first mount and for moving said first mount in said direction upon rotation of said shaft, said lever means being slidable longitudinally with respect to said shaft upon the movement as a unit of said first and second mounts caused by rotation of said frame.

11. The improvement claimed in claim 8, wherein said transmission means comprises an eccentric surface of said shaft, and a curved plate spring attached to said first mount and said second mount, said eccentric surface comprising means for spreading said spring upon rotation of said shaft for moving said first mount in said direction, said spring being slidable longitudinally with respect to said spreading means upon the movement as a unit of said first and second mounts caused by rotation of said frame.

12. The improvement claimed in claim 8, wherein said transmission means comprises gear teeth formed on the periphery of said shaft; a gear wheel rotatably mounted on said second mount and meshing with said gear teeth; and a screw integral with said gear wheel and meshing in a threaded opening in said first mount, said gear wheel being slidable longitudinally with respect to said gear teeth upon the movement as a unit of said first and second mounts caused by rotation of said frame.

13. The improvement claimed in claim 8, wherein said transmission means comprises gear teeth formed on the periphery of said shaft; a gear means mounted on said second mount and meshing with said gear teeth; and a lever integral with said gear means and having an end abuttable with said first mount for moving said first mount in said direction upon rotation of said shaft, said gear means being slidable longitudinally with respect to said gear teeth upon the movement as a unit of said first and second mounts caused by rotation of said frame.

* * * * *